US007920165B2

(12) United States Patent
Adderton

(10) Patent No.: US 7,920,165 B2
(45) Date of Patent: Apr. 5, 2011

(54) VIDEO TRAINING SYSTEM

(76) Inventor: Dennis M. Adderton, Santa Barbara, CA (US)

( * ) Notice: Subject to any disclaimer, the term of this patent is extended or adjusted under 35 U.S.C. 154(b) by 1574 days.

(21) Appl. No.: 11/235,882

(22) Filed: Sep. 26, 2005

(65) Prior Publication Data

US 2007/0069977 A1 Mar. 29, 2007

(51) Int. Cl.
*G02B 27/14* (2006.01)
*H04N 7/18* (2006.01)

(52) U.S. Cl. ........................................ 348/143; 359/630

(58) Field of Classification Search .................... 348/58, 348/52, 51, 42, 46, 47, 53, 54, 143, 55, 56, 348/57, 59, 60, 121, 122, 123, 124; 359/632, 359/633, 634, 485, 462, 631, 630
See application file for complete search history.

(56) References Cited

U.S. PATENT DOCUMENTS

| | | | | | |
|---|---|---|---|---|---|
| 3,919,475 | A | * | 11/1975 | Dukich et al. | 348/211.4 |
| 4,757,714 | A | * | 7/1988 | Purdy et al. | 73/597 |
| 4,852,988 | A | * | 8/1989 | Velez et al. | 351/210 |
| 5,200,827 | A | * | 4/1993 | Hanson et al. | 348/216.1 |
| 5,502,481 | A | * | 3/1996 | Dentinger et al. | 348/51 |
| 5,646,783 | A | * | 7/1997 | Banbury | 359/630 |
| 5,984,684 | A | | 11/1999 | Brostedt | |
| 6,522,312 | B2 | * | 2/2003 | Ohshima et al. | 345/8 |
| 6,881,067 | B2 | | 4/2005 | Tarry | |
| 7,289,130 | B1 | * | 10/2007 | Satoh et al. | 345/629 |
| 2001/0045919 | A1 | * | 11/2001 | Ishikawa et al. | 345/8 |
| 2001/0045978 | A1 | * | 11/2001 | McConnell et al. | 348/42 |
| 2002/0097321 | A1 | * | 7/2002 | McBride | 348/148 |
| 2003/0086061 | A1 | * | 5/2003 | Pfleger | 351/209 |
| 2003/0130035 | A1 | * | 7/2003 | Kanarat | 463/31 |
| 2004/0263614 | A1 | * | 12/2004 | Banju et al. | 348/58 |
| 2005/0195277 | A1 | * | 9/2005 | Yamasaki | 348/61 |
| 2005/0200750 | A1 | * | 9/2005 | Ollila | 348/375 |
| 2006/0033992 | A1 | * | 2/2006 | Solomon | 359/462 |

* cited by examiner

*Primary Examiner* — Jerome Grant, II
(74) *Attorney, Agent, or Firm* — NUPAT, LLC; Morrison Ulman

(57) ABSTRACT

A self-viewing environment and an apparatus enabling unrestricted movement of a subject within the self-viewing environment are disclosed. A subject wears a head mounted display that receives a video signal by wireless transmission. The subject is positioned within the field of view of a video camera that sources a video image for transmission to the subject. Video mirror-imaging and signal-processing are employed to adapt the perceived self-viewing environment for the benefit of the subject.

14 Claims, 6 Drawing Sheets

VIDEO TRAINING SYSTEM

TECHNICAL FIELD

The invention relates generally to video training systems. In particular it relates to systems for video self-observation.

BACKGROUND

People communicate a great deal about their self esteem, level of confidence and relative dominance or submission to others within a given environment through non-verbal cues. Among nonverbal cues are posture, gesture, gait and movement that may be collectively expressed as poise and grace. Despite the importance of non-verbal cues, most people expend little or no effort training to improve their eloquence in physical expression.

Many disciplines and arts focus on gaining understanding and control of movement such as dance, gymnastics and various martial arts. Also, achievement in many competitive sporting activities is strongly dependent upon correct form and requires discipline of movement.

Training one's physical expression is hampered by a lack of instant visual feedback in conventional training routines. Conventional exercises do not permit subjects to observe themselves. Instead a subject must rely on oral feedback from an instructor.

It is difficult to change one's behavior without being able to observe it. What is needed are a system and method for training people with instant feedback. An effective training system would allow a subject to observe her behavior in real-time and to modify her physical expression. The system should provide a continuous visual image of the subject so that she may make behavioral adjustments on the fly.

DETAILED DESCRIPTION

Figure 1:
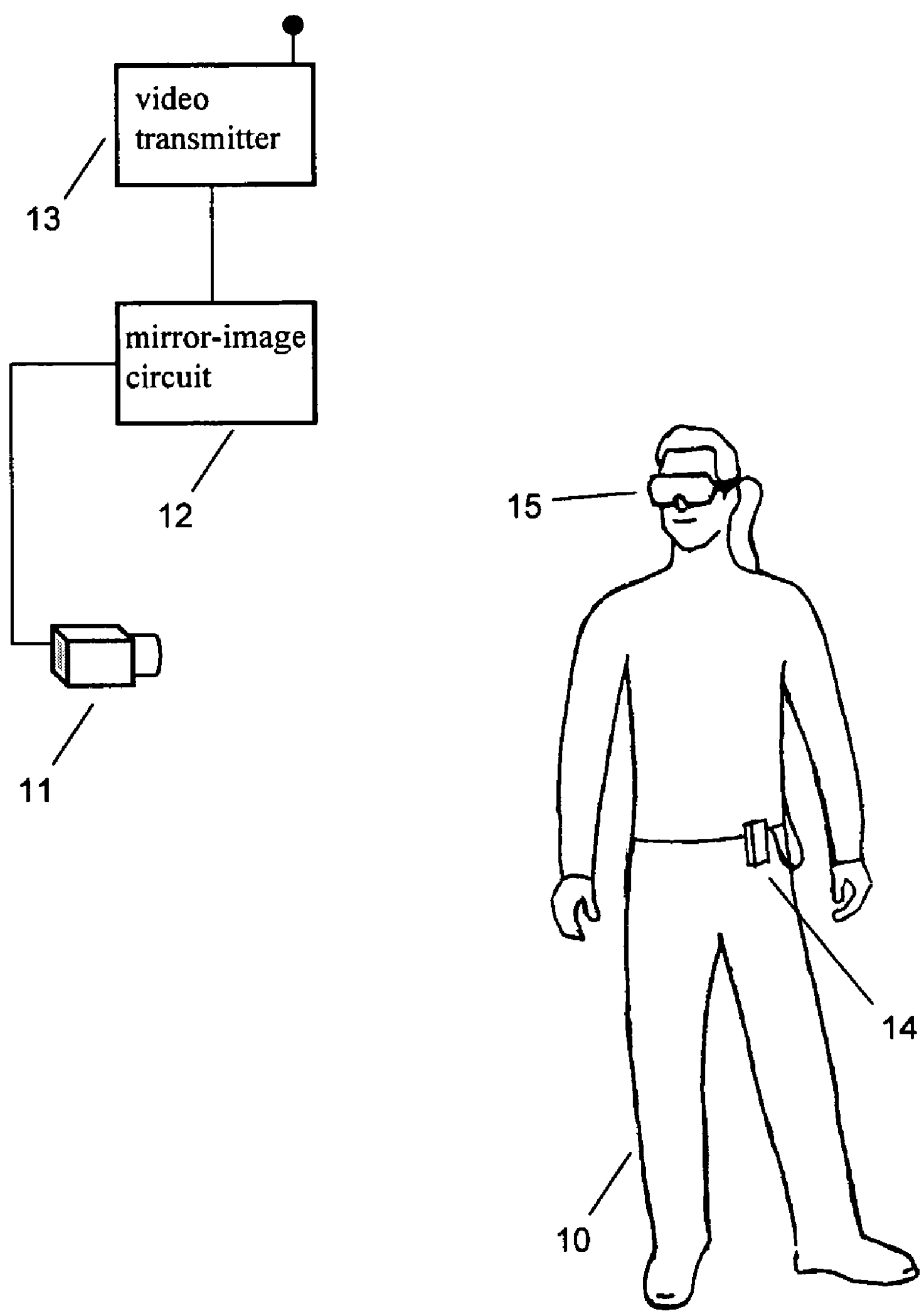
FIG. 1 illustrates a self-viewing environment with a single camera, a mirror image circuit and a video transmitter. A subject is within the field of view of the camera wearing a head-mounted video display on which appears the video image received by a video receiver.

A video viewing system is described herein that may serve as a tool for people to effectively practice discipline of movement under self-observation. A video camera is directed at a subject and a head mounted display, worn by the subject displays a real time self-image. Several other features are included in the system.

For effective self observation with the subject in motion, it is important that the head mounted display is unencumbered with cabling connecting it to the camera or video processing system. For this reason, a wireless video link is used to transmit the self-image video stream from the video processing system to the head mounted display worn by the subject. The video receiver for the head mounted display is preferably small and lightweight and incorporates some means for comfortable wearability by the subject.

Conventionally, self-viewing is practiced with a mirror and a subject is familiar with viewing her own mirror image. A subject typically becomes disoriented when viewing their video self-image in a head mounted display because the video image is not mirrored. This disorientation manifests as difficulty in coordinating movement with the self-image, as it appears to be in opposition. To rectify this, the video training system incorporates a video mirror imaging circuit employed when the subject is facing the camera so that the subject will view a correctly mirrored image. This enhancement simplifies the subject's coordination of her movement with the video self-image.

The subject is free to move rotationally with respect to the camera and may require self-viewing with the subject's rear facing the camera. In this case the mirror imaging circuit should not be employed as it puts the self-image in opposition to the subject's perspective. A subject orientation sensing system is included in the video training system so that the video mirror imaging circuit may be appropriately employed only when the subject is facing the camera without encumbering the subject with any responsibility to decide upon the appropriate view.

Furthermore, it may be advantageous for the subject to view the video self-image from multiple camera perspectives. Multiple camera inputs are accommodated by incorporating a video multiplexing circuit. Preferably, this circuit is integrated with the video processing system and selects the appropriate video source upstream of the video transmission. The subject or an instructor may be equipped with a remote control selector with which she may switch between different camera perspectives or other video sources.

Also included is optional input to the video multiplexer for a video stream other than the self-image video stream. The auxiliary video stream may be prerecorded as in the case of a demonstration video for correct form or movement. Alternatively, the auxiliary video stream may be live video of the instructor or of an activity partner. Additionally, the instructor or activity partner may be at a remote location and the auxiliary video stream may be sourced from a wired or wireless transmission. The image of a remote activity partner may also be combined with the self-image of the subject by a Chroma-Key color replacement technique. In this case, the environment of the subject is colored and illuminated monochromatically, preferably in a bright blue or bright green color. With the application of Chroma-Key technology to the self-image video stream, the background is subtracted from the subject's image. Subsequently, the image of a remote activity partner is substituted as an artificial background. Conversely, the background of the activity partner may be subtracted such that the video image of the remote activity partner may be superimposed on the self-image video stream of the subject.

Although the video training system accommodates a remotely located instructor, the preferred embodiment is best suited for an instructor personally present with the subject. In this case an instructor head mounted display that may display the same or an alternate video stream is provided. In the simplest embodiment, the instructor wears a head mounted display identical to the one the subject is wearing with the same video stream displayed. In this case, the wireless video receiver of the instructor display may be tuned to receive the same transmission as the subject's display.

Alternately, the instructor head mounted display may be configured to receive and display an alternate video stream. In this case, the video processing system transmits an additional video stream distinct from the subject's video stream. The video receiver of the instructor video headset is tuned to receive the additional video stream. The instructor may select the same or an alternate camera perspective from the subject. Selection of the camera perspective is preferably controlled via a remote control interface to the video processing system.

Additionally, the instructor head mounted display may also incorporate a camera mounted to the front of the display. This camera is configured for a first person perspective as the camera view, when worn by the instructor, approximates the view of the instructor looking forward without a video display. The instructor head mounted display and video receiver assembly incorporates a bypass switch allowing the instructor to select the first person perspective by bypassing the transmitted video stream and routing the video signal from the head mounted camera to the head mounted display. Alternatively, the head mounted camera may include a transmitter for routing of the first person camera perspective to the video processing system. This video stream may then be routed by the video processing system to any transmitted video stream.

As described above, the video training system includes a remote control interface to the video processing system. The primary purpose of the remote control is to select the preferred video source. The subject may select the optimal camera perspective by switching the video multiplexer by remote control. Also the subject may initiate delivery of a prerecorded video stream by remote control. Also the instructor may select the first person perspective or a first person perspective from another individual by remote control. Furthermore, any of the above-described functions, with particular respect to the multiplexing of video streams may be performed by the video processing system according to an algorithm and without input from any remote control interface. Such an algorithm may use an analysis of the subject's position, orientation or characteristic motions of the subject to decide the appropriate video stream for delivery to the subject.

The video processing system may select between camera perspectives according to an algorithm instead of selection from a remote control interface. Such an algorithm is preferably designed to provide the subject with the optimum self-viewing perspective based upon the subject's position with respect to the various cameras. Such an algorithm requires the video processing system to calculate the position of the subject. For this purpose, the video training system includes a means for locating the subject position with respect to the various cameras. This may be accomplished by image processing techniques for identifying the subject and her position within the views of the various video streams. Based upon the automatic image analysis of the video streams, the video processing system may select the optimum camera perspective for transmission to the subject's head mounted display. In the simplest case, motion detection, either by analysis of the video stream or by employment of a motion-sensor will serve to ascertain the subject's location within the environment.

In the case where there are multiple subjects within a camera view, it is likely that the imaging processing technique will have difficulty in selecting the optimal camera perspective for each respective subject. Multiple subjects are accommodated by including a subject locating system which relies on incorporating an identification beacon with the head mounted display assembly or otherwise affixing an identification beacon to each individual subject that is addressed by the video processing system. Position location may be ascertained by monitoring identification beacon receivers incorporated with the various cameras of the system or otherwise by monitoring identification beacon receivers appropriately incorporated into the subject's environment. Alternatively, the video streams from the various cameras may be processed to extract the identification beacon signal from the respective video stream. The identification beacon data is then processed by the video processing system to ascertain the location of each subject within the environment.

A specific configuration is described where two or more instructor head mounted displays are delivered video streams from the head mounted camera of another instructor. In the case of two instructors, their perspective is effectively swapped (referred to herein as diadically swapped vision) such that each may experience the others visual perspective. The configuration of diadically swapped vision may also be implemented without a video processing system. The head mounted video perspective of one instructor may be directly delivered to the head mounted display of the opposite instructor via either wired or wireless transmission.

Furthermore, it is possible to eliminate the need for a video processing system while providing for orientation sensing and appropriate mirror imaging. In this mode two video streams are transmitted on two separate channels. One of the two video streams is a mirror-imaged view of the other. The head mounted display incorporates an orientation sensing means such as an infrared sensor. An orientation beacon, such as an infrared source, is fixed with respect to the environment to provide an orientation reference to the subject. The head mounted display is equipped with the capability of receiving either of the two transmitted video signals. The orientation sensing system of the head mounted display is coupled to a video selection switch that selects between the two transmitted video signals. The orientation sensing system causes the appropriate video stream to be selected and delivered to the head mounted display such that the subject will be viewing a mirror-imaged view when facing the camera and a non mirror imaged view when facing away from the camera.

Additionally, this embodiment may incorporate more than two video channels and the head mounted display may incorporate a video processing system that will select between the video channels based upon an algorithm.

Furthermore any of the embodiments that incorporate a video processing system may be equipped with a variety of video processing technologies that enable the application of special effects to the video stream. The application of special effects to video stream may be controlled by the subject with a remote-control selector, or may be controlled by the instructor by an interface to the video processing system, remote or otherwise. Preferably, the application of special effects is controlled by an algorithm executed by a controlling computer. Such an algorithm may use input data based on the subject's position, orientation, or particular activity to make decisions and trigger events. Also the self-viewing environment is preferably prepared to be compatible with Chroma- Key color replacement technology. The field of view of the cameras presents a monochromatic background, typically of a bright blue or bright green color. Emerging technologies also utilize specialized illumination sources to obviate the need for a colored background in the color replacement process. Color replacement video processing may be employed to render the self-image within a false environment, as presented to the head-mounted display of the subject. Such a false environment may be comprised of prerecorded video or of computer generated visual effects. The false environment may also include artificial participants, such as individuals appearing in prerecorded video, computer generated characters, or remotely located participants.

It should be noted that the distinctions between subject and instructor are made for convenience and in no way limit the manner in which the video training system may be employed. Also the configuration of the video training system may be adjusted for specific application to activities not contemplated herein. The use of the video training system is not limited to instruction but may be applied to many recreational or competitive gaming activities. Also the entire self-viewing system may be scaled to accommodate numerous subjects with various roles and mechanisms for interaction.

The video training system may be improved by future improvements in electronics and related technologies enabling new functions. For example, it may become practical to incorporate stereovision into the head mounted displays and the entire system. It may become practical to convert all video signals to digital data for processing or transmission. As the number of subjects in a given environment increases, the potential for interference between transmitted video signals makes it increasingly beneficial to incorporate digitization and encryption of the transmitted video signals. The video signals may then be transmitted in a manner that makes efficient use of the frequency spectrum, for example using a spread-spectrum format. Encryption of the transmitted digital video signals also serves to protect the privacy of the subject within the self-viewing environment.

Referring now to FIG. 1, a subject (10) is positioned within the field of view of a camera (11). Camera (11) outputs a video signal to a mirror-image circuit (12). Mirror-image circuit (12) serves to flip the video signal horizontally and outputs a mirrored video signal to video transmitter (13). Video transmitter (13) modulates and transmits the mirrored video signal on a suitable frequency, for example, 2.1 gigahertz. Video receiver (14) receives and demodulates the mirrored video signal and outputs the signal to head-mounted display (15). The mirrored video signal is displayed as a mirrored video image on head-mounted display (15) for subject (10) to view. By the configuration of the components in FIG. 1, subject (10) may view himself in the image displayed on the head-mounted display (15) and move about freely within the self-viewing environment composed thereby.

Figure 2:
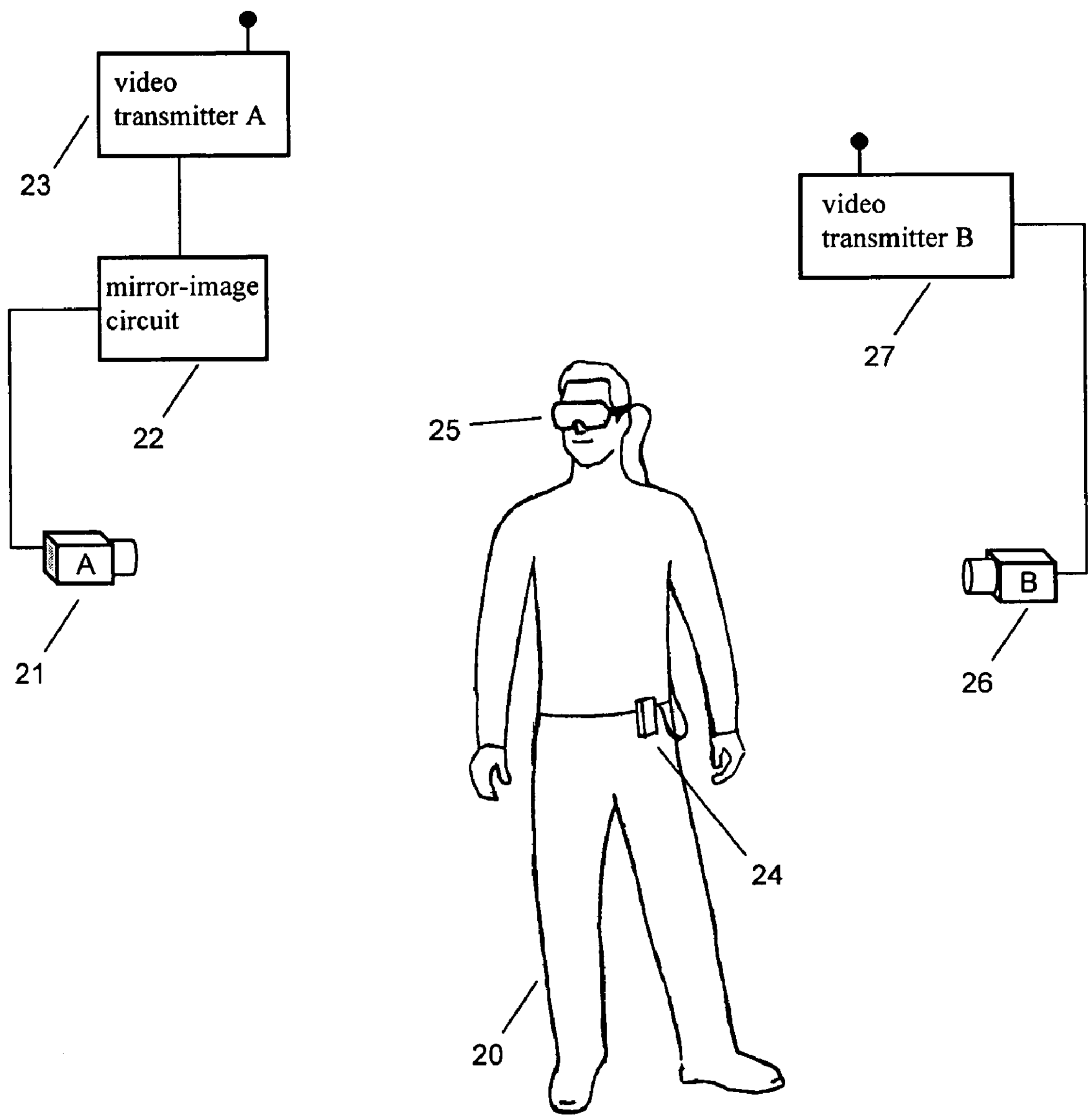
FIG. 2 illustrates a dual camera self-viewing environment in which one camera is configured for a mirror image. A subject is within the field of view of one or both of the cameras wearing a head-mounted display which may display the video image from either of the two cameras.

Referring now to FIG. 2, a subject (20) is positioned within the field of view of camera A (21). Camera A (21) outputs a video signal to a mirror-image circuit (22). Mirror-image circuit (22) serves to flip the video signal horizontally and outputs a mirrored video signal to video transmitter A (23). Video transmitter A (23) modulates and transmits the mirrored video signal on a suitable frequency, for example, 2.1 gigahertz on a specific channel, for example, channel A. Video receiver (24) is a dual channel receiver with the individual video channels A and B. Subject (20) has the option of selecting which channel is outputted by receiver (24). In the first case, subject (20) chooses to select video channel A for viewing. Video receiver (24) receives and demodulates the mirrored video signal on channel A and outputs the signal to head-mounted display (25). The mirrored video signal is displayed as a mirrored video image on head-mounted display (25) for subject (20) to view.

Subject (20) is also positioned within the field of view of camera B (26). Camera B (26) outputs a video signal to video transmitter (27). Video transmitter (27) modulates and transmits the video signal on a suitable frequency, for example, 2.1 gigahertz on a specific channel, for example, channel B. Video receiver (24) is a dual channel receiver with the individual video channels A and B. Subject (20) has the option of selecting which channel is outputted by receiver (24). In the second case, subject (20) chooses to select video channel B for viewing. Video receiver (24) receives and demodulates the video signal on channel B and outputs the signal to head-mounted display (25). The video signal is displayed as a video image on head-mounted display (25) for subject (20) to view.

By the configuration of the components in FIG. 2, subject (20) may view himself in the image displayed on the head-mounted display (25) and move about freely within the self-viewing environment composed thereby. When viewing from a frontal perspective, subject (20) may preferably select channel A for the inclusion in the mirror-image circuit. When viewing from a rear perspective, subject (20) may preferably select channel B in order to exclude the mirror-image circuit.

Figure 3:
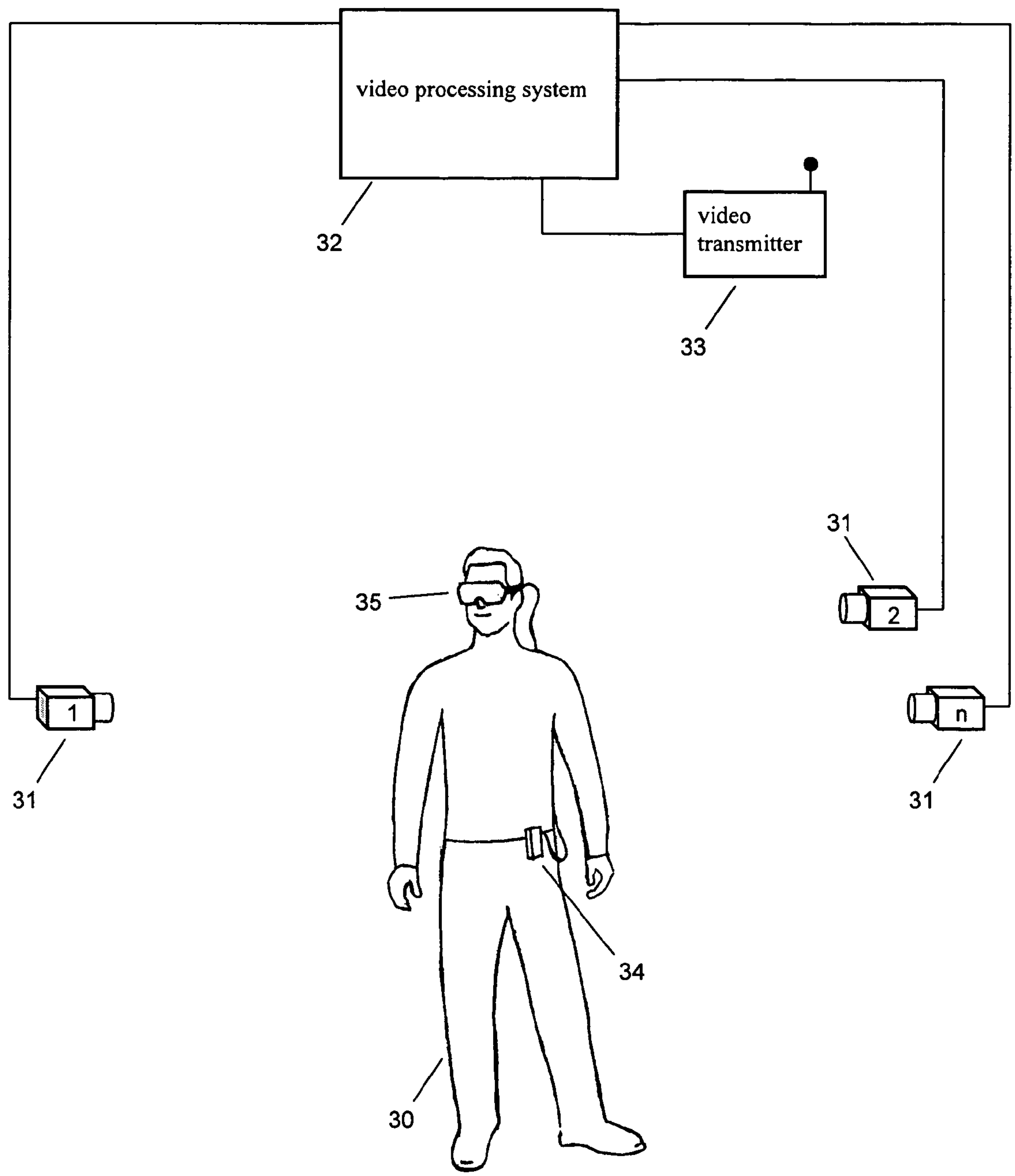
FIG. 3 illustrates a multi-camera self-viewing environment with video processing system wherein a video signal is selected from multiple camera sources and transmitted to the subject for viewing on a head mounted display.

Referring now to FIG. 3, a subject (30) is positioned within the field of view of one or more cameras, cameras 1 through n (31). Cameras 1 through n (31) each output a video signal to a video processing system (32). Video processing system (32) is described in further detail in FIG. 6. Video processing system (32) serves to select a video signal from cameras 1 through n and optionally perform processing of the selected video signal and outputs a processed video signal to video transmitter (33). Video transmitter (33) modulates and transmits the processed video signal on a suitable frequency, for example, 2.1 gigahertz. Video receiver (34) receives and demodulates the processed video signal and outputs the signal to head-mounted display (35). The processed video signal is displayed as a video image on head-mounted display (35) for subject (30) to view. By the configuration of the components in FIG. 3, subject (30) may view himself in the image displayed on the head-mounted display (35) and move about freely within the self-viewing environment composed thereby.

Figure 4:
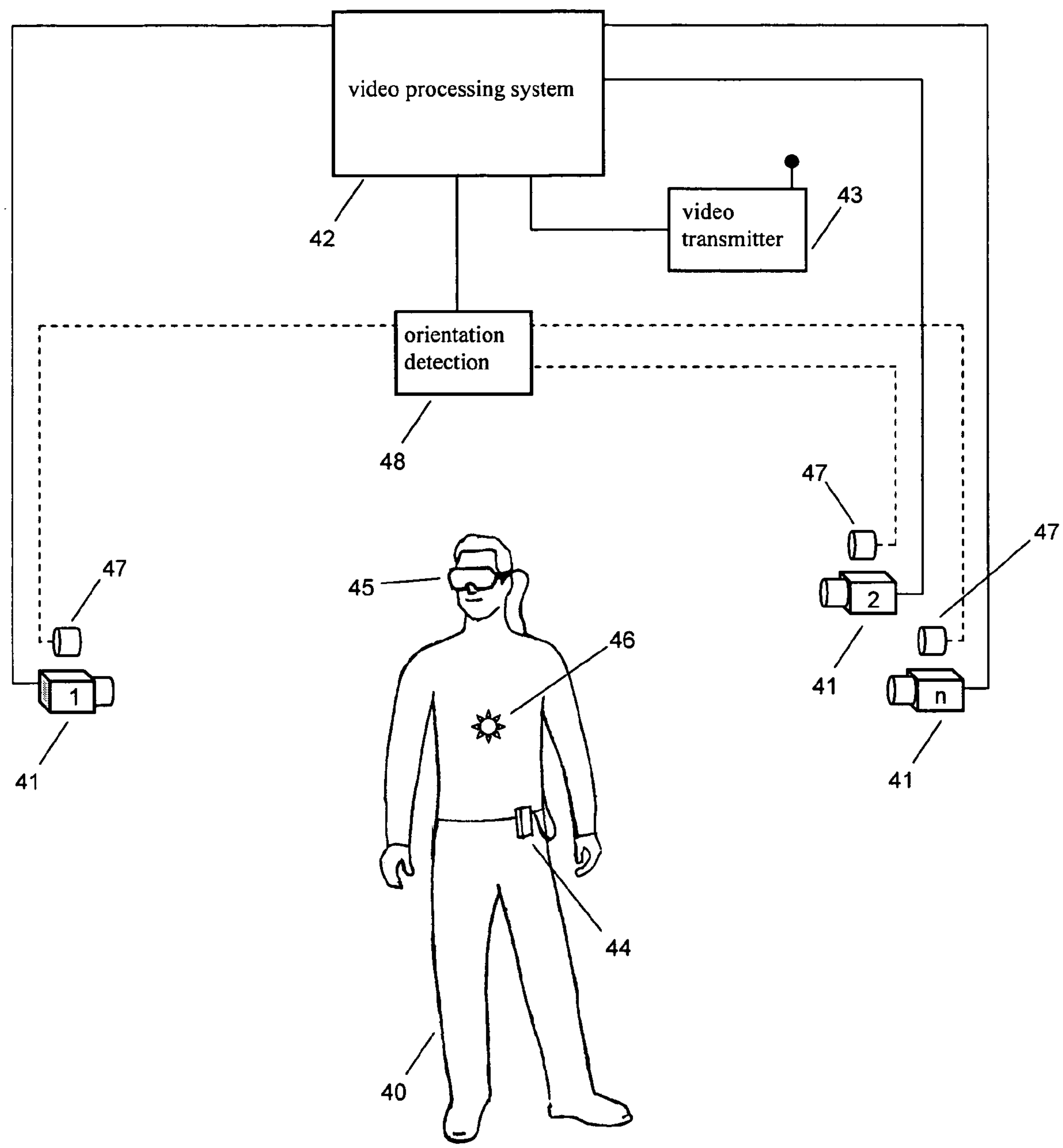
FIG. 4 illustrates a multi-camera self-viewing environment with orientation detection wherein the video processing system may ascertain the approximate location and orientation of the subject and utilize the information to select the optimum video signal for transmission to the subject.

Referring now to FIG. 4, a subject (40) is positioned within the field of view of one or more cameras, cameras 1 through n (41). Cameras 1 through n (41) each output a video signal to a video processing system (42). Video processing system (42) is described in further detail in FIG. 6. Video processing system (42) serves to select a video signal from cameras 1 through n and optionally perform processing of the selected video signal and outputs a processed video signal to video transmitter (43). Video transmitter (43) modulates and transmits the processed video signal on a suitable frequency, for example, 2.1 gigahertz. Video receiver (44) receives and demodulates the processed video signal and outputs the signal to head-mounted display (45). The processed video signal is displayed as a video image on head-mounted display (45) for subject (40) to view.

Orientation beacon (46) is affixed to subject (40) so that it appears visible from the front but not from behind subject (40). Otherwise, orientation beacon (46) is affixed to subject (40) so that it appears visible from the rear but not from the front of subject (40). Orientation beacon (46) is, for example, a flashing infrared emitter. Orientation sensors 1 through n (47) are collocated adjacent to cameras 1 through n (41) respectively. Orientation sensors 1 through n (47) output a signal to orientation detection system (48) to represent the positive detection of orientation beacon (46) by the sensors. Orientation detection system (48) compiles the signals from orientation sensors 1 through n (47) to ascertain the position and orientation of subject (40) with respect to the sensors. Orientation detection system (48) outputs the position and orientation data to video processing system (42), which uses the data to select the most appropriate video signal for transmission to subject (40). By the configuration of the components in FIG. 4, subject (40) may view himself in the image displayed on the head-mounted display (45) and move about freely within the self-viewing environment composed thereby.

Figure 5:
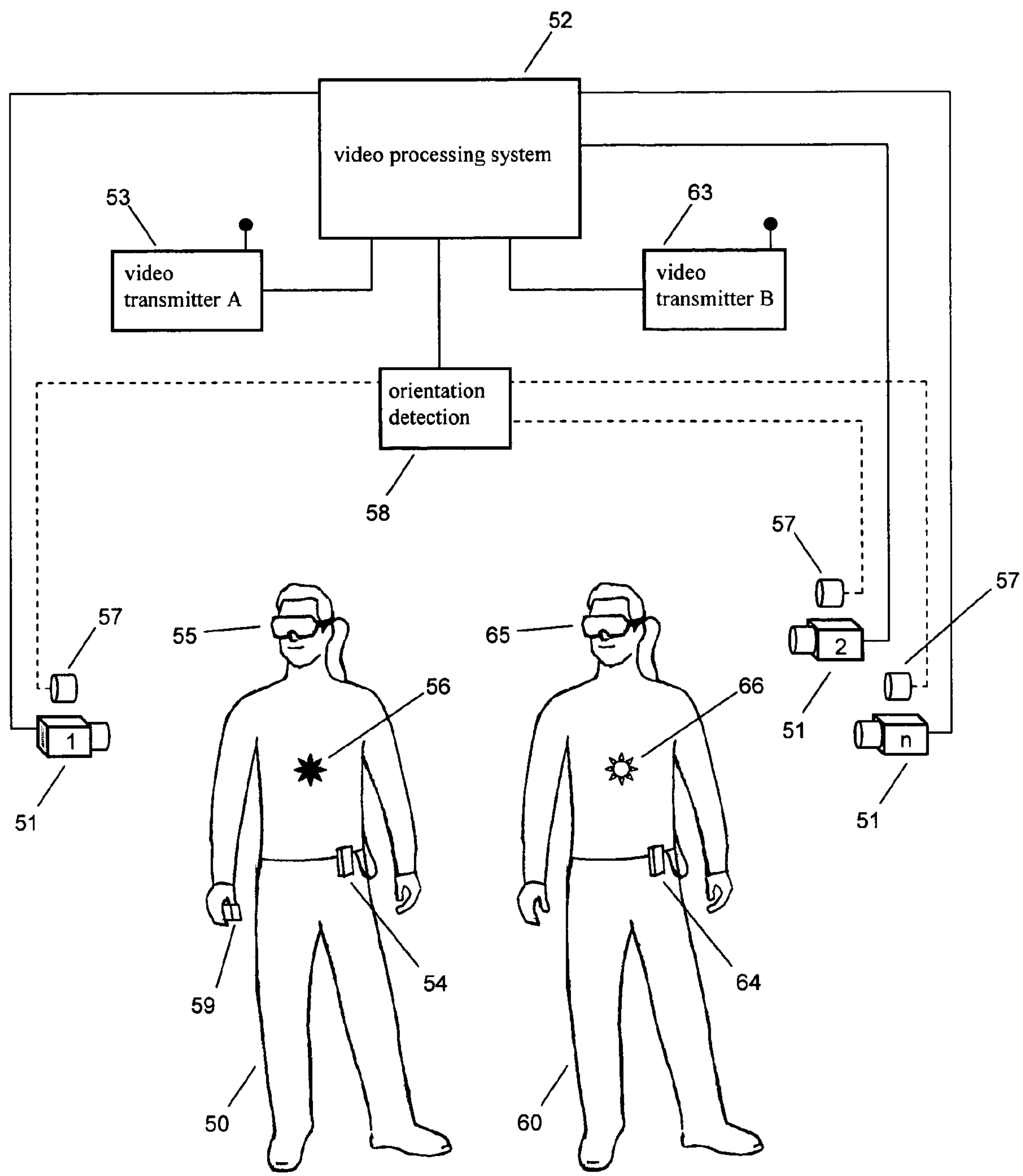
FIG. 5 illustrates a multi-camera self-viewing environment with orientation detection wherein the video processing system may ascertain the approximate location and orientation of more than one subject and utilize the information to select the optimum video signal for transmission to each subject respectively.

Referring now to FIG. 5, a subject (50) and an instructor (60) are positioned within the field of view of one or more cameras, cameras 1 through n (51). Cameras 1 through n (51) each output a video signal to a video processing system (52). Video processing system (52) is described in further detail in FIG. 6. Video processing system (52) serves to select a video signal appropriate for subject (50) from cameras 1 through n and optionally performs processing of the selected video signal and outputs a processed video signal to video transmitter A (53). Video processing system (52) also serves to select a video signal appropriate for instructor (60) from cameras 1 through n and optionally performs processing of the selected video signal and outputs a processed video signal to video transmitter B (63). Video transmitter A (53) modulates and transmits the mirrored video signal on a suitable frequency, for example, 2.1 gigahertz on a specific channel, for example, channel A. Video transmitter B (63) modulates and transmits the mirrored video signal on a suitable frequency, for example, 2.1 gigahertz on a specific channel, for example, channel B. Video receiver (54) receives and demodulates the processed video signal on channel A and outputs the signal to head-mounted display (55). The processed video signal is displayed as a video image on head-mounted display (55) for subject (50) to view.

Video receiver (64) receives and demodulates the processed video signal on channel B and outputs the signal to head-mounted display (65). The processed video signal is displayed as a video image on head-mounted display (65) for instructor (60) to view.

Orientation beacon (56) is affixed to subject (50) so that it appears visible from the front but not from behind subject (50). Otherwise, orientation beacon (56) is affixed to subject (50) so that it appears visible from the rear but not from the front of subject (50). Orientation beacon (66) is affixed to instructor (60) so that it appears visible from the front but not from behind instructor (60). Otherwise, orientation beacon (66) is affixed to instructor (50) so that it appears visible from the rear but not from the front of instructor (60). Orientation beacon (56) and orientation (66) are, for example, flashing infrared emitters with a distinguishing feature between the two such as color or flash frequency. Preferably, the flashing serves to digitally encode a unique identity assigned to each beacon. Orientation sensors 1 through n (57) are collocated adjacent to cameras 1 through n (51) respectively. Orientation sensors 1 through n (57) output a signal to orientation detection system (58) to represent the positive detection of orientation beacon (56) or orientation beacon (66) by the sensors. Orientation detection system (58) compiles the signals from orientation sensors 1 through n (57) to ascertain the position and orientation of subject (50) and instructor (60) with respect to the sensors. Orientation detection system (58) outputs the position and orientation data to video processing system (52), which uses the data to select the most appropriate video signal for transmission to subject (50) and the most appropriate video signal for transmission to instructor (60). By the configuration of the components in FIG. 5, subject (50) and instructor (60) may view themselves in the image displayed on the head-mounted display (55) and head mounted display (65) respectively and move about freely.

Subject (50) carries a remote control (59) which is operable to select a video image from a video camera for display on the head-mounted video display. In this way the subject can select different views according to the desired training mode.

Figure 6:
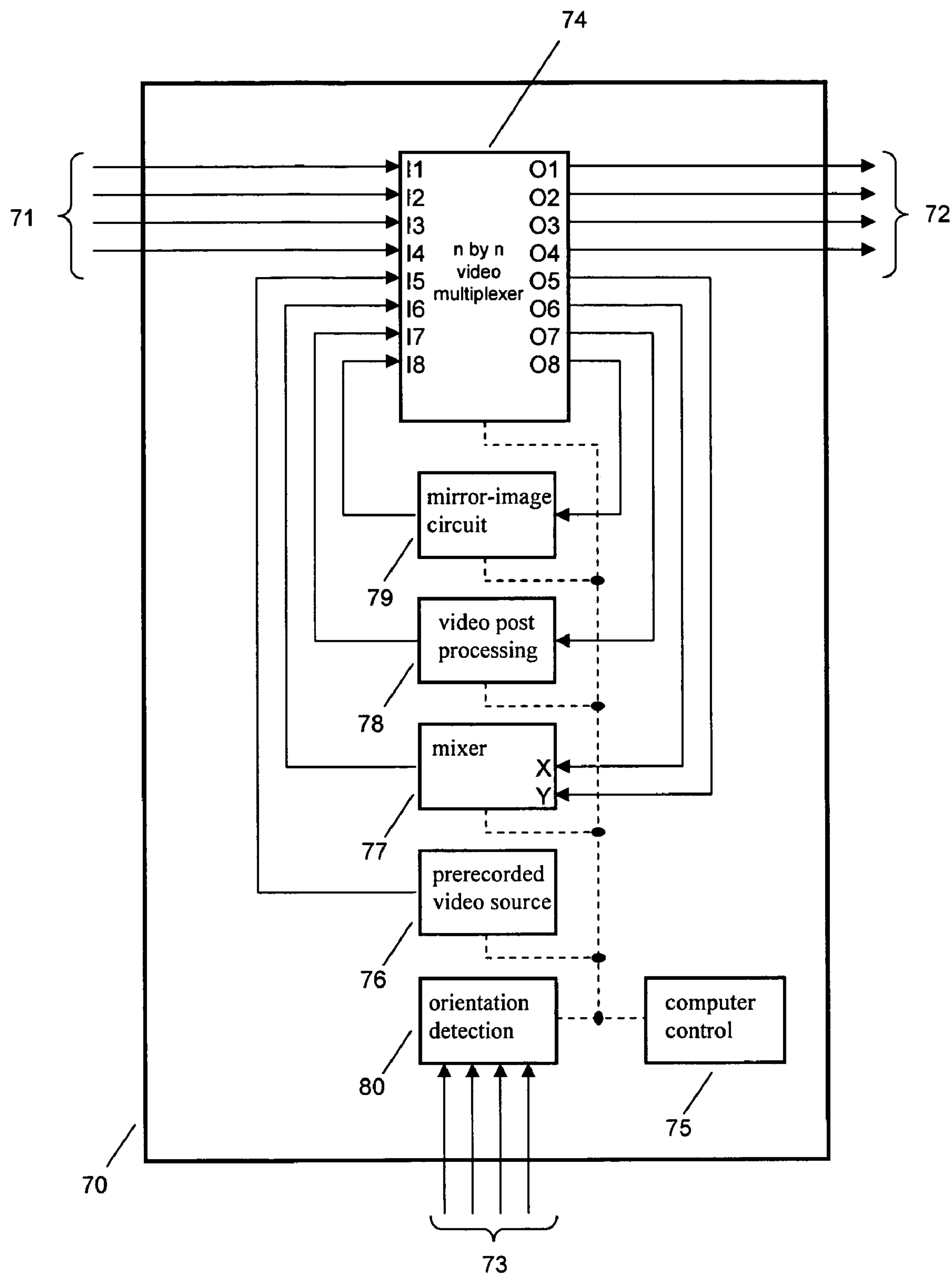
FIG. 6 illustrates a video processing system for a multi-camera self-viewing environment including computer control of video multiplexing, video signal processing, and subject position and orientation detection.

FIG. 6 describes a video processing system suitable to be employed in the self-viewing environments described in FIGS. 3, 4, and 5. Video processing system (70) includes a video multiplexer (74) suitable for routing video signals with minimal degradation to the integrity and quality of the signal.

Video processing system (70) has four video inputs (71). Four inputs are shown in FIG. 6 for convenience; however any number of video inputs may be contemplated. Video inputs (71) are sourced by cameras (not shown in FIG. 6) within the self-viewing environments described in FIGS. 3, 4, and 5.

Video processing system (70) has four video outputs (72). Four outputs are shown in FIG. 6 for convenience; however any number of video outputs may be contemplated. Video outputs (72) lead to video transmitters (not shown in FIG. 6) within the self viewing environments described in FIGS. 3, 4, and 5.

Video processing system (70) has four orientation sensor inputs (73). Four inputs are shown in FIG. 6 for convenience; however any number of orientation sensor inputs may be contemplated.

Video multiplexer (74) has eight inputs shown on its left side and labeled I-1 through I-8. Eight inputs are shown in FIG. 6 for convenience; however any number of multiplexer inputs may be contemplated.

Video multiplexer (74) has eight outputs shown on its right side and labeled O-1 through O-8. Eight inputs are shown in FIG. 6 for convenience; however any number of multiplexer outputs may be contemplated.

Four video inputs (71) connect to video multiplexer (74) at multiplexer inputs I-1 through I-4 respectively.

Inputs I-5 through I-8 of video multiplexer (74) connect to the outputs of video processing modules, which come under control of computer control (75). Input I-5 is connected to the output of a prerecorded video source (76). Input I-6 is connected to the output of video mixer (77). Video mixer (77) serves to combine two video signals into one using a mixing algorithm. Input I-7 is connected to the output of video post processing (78). Video post processing (78) may serve such functions as filtering, fading, delaying, repeating, or any other video post processing technique. Input I-8 is connected to the output of mirror-image circuit (79). Mirror-image circuit (79) serves to flip a video stream horizontally.

Outputs O-6 through O-8 of video multiplexer (74) connect to the inputs of video processing modules, which come under control of computer control (75). Output O-5 is connected to the Y input of video mixer (77). Output O-6 is connected to the X input of video mixer (77). Output O-7 is connected to the input of video post processing (78). Output O-8 is connected to the input of mirror-image circuit (79).

As an illustration of the usefulness of video processing system (70) one example is described wherein each component of the described system is employed to affect the subject's experience of the self-viewing environment. A subject appears within the field of view of a camera in the self-viewing environment of FIG. 3. The video signal output from the camera is input to video processing system (70) at input I-1. An orientation sensor, connected at the orientation sensor inputs (73) indicates that the subject is facing the camera. Orientation detection (80) identifies which camera within the self-viewing environment the subject is facing based on the orientation sensor signals on the inputs (73) and communicates the orientation data to computer control (75). Because the subject is facing the camera, computer control (75) communicates to multiplexer (74) the command to route input I-1 to output O-8 so that the video signal may be mirror imaged. Computer control (75) also communicates to multiplexer (74) the command to route input I-8 to output O-7 so that the mirror-imaged video signal will undergo post-processing such as contrast and brightness control. Computer control (75) also communicates to multiplexer (74) the command to route input I-7 to output O-6 to be mixed with prerecorded video. Computer control (75) also communicates to multiplexer (74) the command to route input I-5 to output O-7 so that the output of prerecorded video source (76) is also routed to video mixer (77). Computer control communicates to prerecorded video source (76) the command to deliver a specific prerecorded video and communicates to video mixer (77) the command to mix the two video signal in an appropriate manner. The prerecorded video may be a demonstration video of movement which the subject is expected to mimic. Video mixer may, for example, serve to inset the prerecorded video in one corner of the mirror-imaged video signal or otherwise fade between the two video signals. Computer control (75) also communicates to multiplexer (74) the command to route input I-6 to output O-1 so that the output of video mixer (77) is output to video outputs (72) and subsequently transmitted within the self-viewing environment to the subject. The subject may then view some combination of the self-image video signal and the prerecorded demonstration video in order to optimize her own mimicry of the prerecorded video.

Alternately, video processing system (70) may be optimized for color separation to accommodate a blue-screen or green-screen self-viewing environment as a means to substitute an artificial background in the self-image video signal. The blue-screen or green-screen embodiment may require a monochromatic self-viewing environment.

As one skilled in the art will readily appreciate from the disclosure of the present embodiment, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

While the invention has been described in connection with what are presently considered to be the most practical and preferred embodiments, it is to be understood that the invention is not limited to the disclosed embodiments and alternatives as set forth above, but on the contrary is intended to cover various modifications and equivalent arrangements included within the scope of the following claims.

What is claimed is:

1. A video training system comprising:

a video camera;

a mirror-image circuit;

a head-mounted video display to be worn by a person;

an orientation detector; and, an orientation beacon to be worn by the person; wherein, the video camera sends a video signal to the head-mounted video display whenever the orientation detector receives an orientation signal automatically generated from the orientation beacon indicating a first orientation; and, the video camera, operating with the mirror-image circuit, sends a mirror-imaged video signal to the head-mounted video display whenever the orientation detector receives an orientation signal automatically generated from the orientation beacon indicating a second orientation.

2. A system as in claim 1 wherein the video signal and the orientation signal are transmitted wirelessly.

3. A system as in claim 2 further comprising:

a video processing system which comprises a video multiplexer circuit for routing video signals.

4. A system as in claim 3 wherein the video processing system further comprises:

a video post-processing unit for filtering, fading, delaying or repeating video signals.

5. A system as in claim 4 wherein the video processing system further comprises:

a video mixer for combining two video signals into one.

6. A system as in claim 5 wherein the video processing system further comprises:

a prerecorded video source.

7. A method for training a person comprising:

positioning a person within the field of view of a video camera;

providing the person with a head-mounted video display; and, providing the person with an orientation beacon which operates with an orientation detection system and a video processing system to automatically select a video image from a video camera for display on the head-mounted video display;

wherein, the head-mounted display shows a normal image or mirror-image of the subject as viewed by the video camera; and, video signals are transmitted to the head-mounted display wirelessly.

8. A method as in claim 7 further comprising:

providing the person with a remote control operable to select a video image from a video camera for display on the head-mounted video display.

9. A video training system comprising:

a plurality of video cameras;

a video processing system;

a plurality of head-mounted video displays to be worn by people;

an orientation detection system; and, a plurality of orientation beacons to be worn by the people; wherein, the video cameras send video signals to the video processing system;

the orientation beacons automatically send wireless orientation signals to the orientation detection system; and, the video processing system, operating with the orientation detection system, selects and sends processed video signals to the head-mounted displays.

10. A system as in claim 9 further comprising:

a remote control operable to manually select a video image from a video camera for display on a head-mounted video display.

11. A system as in claim 9 wherein the video processing system comprises:

a mirror-image circuit.

12. A system as in claim 11 wherein the video processing system further comprises:

a video post-processing unit for filtering, fading, delaying or repeating video signals.

13. A system as in claim 12 wherein the video processing system further comprises:

a video mixer for combining two video signals into one.

14. A system as in claim 13 wherein the video processing system further comprises:

a prerecorded video source.

* * * * *